Patented June 19, 1928.

1,674,455

UNITED STATES PATENT OFFICE.

THOMAS SLOPER, OF WILTSHIRE, ENGLAND.

LOOSE OR FLOATING BEARING BUSH.

Application filed December 31, 1926, Serial No. 158,240, and in Great Britain February 3, 1926.

This invention consists in improvements in or relating to loose or floating bearing-bushes having exterior and interior bearing surfaces.

Prior to this invention the interior surfaces of bearing-bushes of the type described have been provided for lubricating purposes with one or more endless grooves, the path of said groove or path of each of said grooves lying at right angles to the through-way axis of the bearing-bush.

With bearing-bushes having lubricating grooves as described it has been found that the shafts upon which the said bearing-bushes rotate are liable to become ridged and worn unevenly. Further, with such grooves the lubricant is localized and not distributed over the whole bearing surface of said bush.

According to this invention a loose or floating bearing-bush having interior and exterior bearing surfaces has its interior bearing surface and/or its exterior bearing surface provided with one or more endless grooves having a cam-like path or cam-like paths extending circumferentially therearound.

By cam-like path as herein used is meant a path of which a substantial portion departs substantially from a plane in which any point of said path lies, the said plane being at right angles to the axis of the bearing-bush.

Preferably the said endless groove or grooves has or have a path or paths which traverses or traverse a substantial portion of the length of the said bearing surface or bearing surfaces.

Preferably both the exterior and the interior bearing surfaces are provided with the said grooves, the path or paths of the groove or grooves of the interior bearing surface crossing the path or paths of the groove or grooves of the exterior bearing surface.

The said exterior and interior grooves may intercommunicate where their paths cross. Conveniently the sum of the depths of the said exterior and interior grooves is equal to or greater than the thickness of the bearing-bush so that a hole or holes are formed therethrough where the paths of said grooves cross.

Where two or more grooves are provided on a bearing surface, the paths of said grooves may be arranged to cross at one or more points.

In the preferred way of carrying out this invention, as applied for example to bearing-bushes for aircraft wheel hubs of the type described in the specification of United States Patent No. 1,313,646, the interior and exterior bearing surfaces of the bearing-bush have each two endless grooves the path of each said groove extending circumferentially around said bearing surface, traversing a substantial portion of the length thereof, and crossing at one or more points the path of each of the other grooves in both interior and exterior bearing surfaces, all said grooves intercommunicating where their paths cross.

The accompanying drawings show by way of example two constructions according to the invention. In these drawings.

Figure 1:
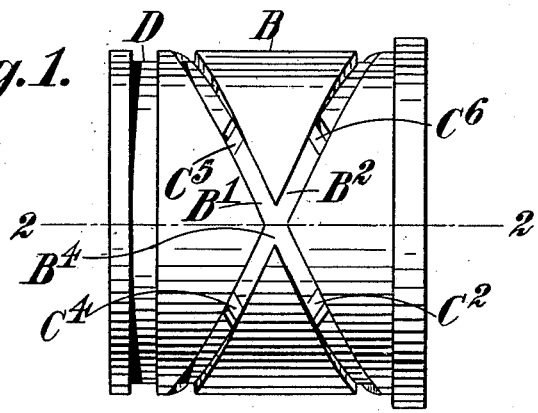
Figure 1 is an elevation of a bearing-bush for an aircraft wheel hub as described in the specification of United States Patent No. 1,313,646 and shows the preferred arrangement of grooves according to this invention.
Figure 2:
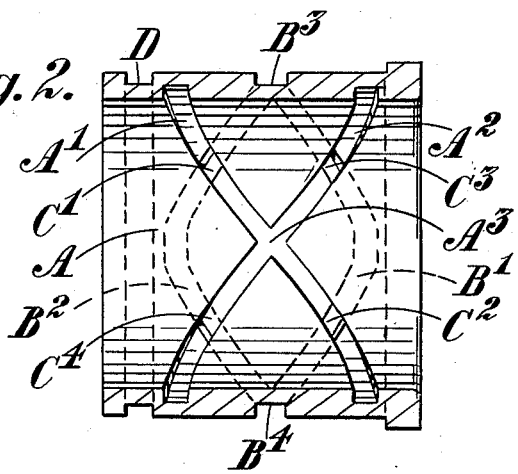
Figure 2 is a sectional view of the same bearing-bush taken on the line 2—2 of Figure 1.

Referring to Figures 1 and 2, the interior and exterior bearing surfaces of the bearing-bush are indicated by A and B respectively. Each of said bearing surfaces has two endless grooves $A^1$, $A^2$ and $B^1$, $B^2$ respectively, the path of each of said grooves extending circumferentially around the bearing surface in which it is provided. The paths of the grooves $A^1$ and $A^2$ traverse in opposite directions very nearly the whole length of the interior bearing surface and cross at two points, only one $A^3$ of which is shown in the drawings. The path of the grooves $B^1$ and $B^2$ likewise traverse in opposite directions very nearly the whole length of the exterior bearing surface B and cross at points $B^3$ and $B^4$. The paths of the grooves $A^1$ and $A^2$ are positioned and arranged so as to cross the paths of the grooves $B^1$ and $B^2$, the path of each groove $A^1$ and $A^2$ crossing the path of each groove $B^1$ and $B^2$ at two points and the grooves intercommunicating at said points. $C^1$, $C^2$, $C^3$, $C^4$, $C^5$, $C^6$ indicate six of the eight points at which the interior and exterior grooves intercommunicate. The communication between said exterior and interior grooves is effected in the example shown by making said grooves of such depth that the sum of their depths is approximately equal to the thickness of the bearing-bush. If it is desired to make the grooves of less depth than the aforesaid, holes may be drilled through the intervening material to provide the intercommunication. The endless groove D is provided to receive the spring-controlled ball-detent for retaining the bush in a wheel-hub as described in the beforementioned prior specification.

Figure 3:
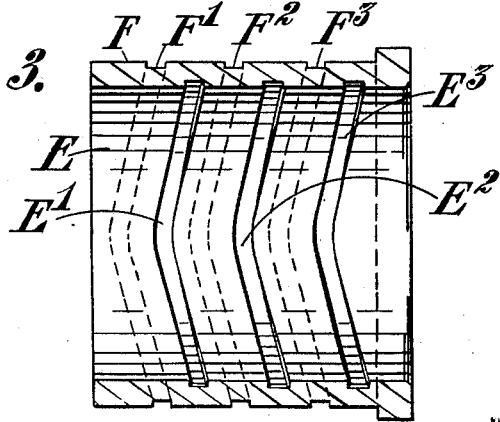
Figure 3 is a sectional view of a modification and shows another way of carrying out this invention.

In Figure 3 which shows another bearing-bush according to this invention, the interior bearing surface E has three endless grooves $E^1$, $E^2$, and $E^3$ having cam-like paths extending circumferentially therearound, and the exterior bearing surface F has three similar grooves $F^1$, $F^2$ and $F^3$. It will be seen that in this case none of the grooves intercommunicate.

It will be realized that the number and paths of the grooves depends on the length of bearing surface to be lubricated and the conditions under which the bearing is used.

In some cases a single endless groove having a cam-like path traversing the greater portion of the length of the bearing-surface and extending circumferentially therearound will be sufficient. The construction shown in Figures 1 and 2 has, however, been found to be the most suitable for a bearing-bush approximately of the proportions shown and for the purpose referred to.

If desired a feeding groove may be provided on the interior or exterior bearing surface of a bearing-bush, the said feeding groove extending from the inward side of the bearing-bush to one or more of the endless grooves for the purpose of supplying grease or other lubricant to the bearing-bush from the interior of the wheel-hub or other rotating member in which the bush is positioned. In the bearing-bush of Figures 1 and 2 the feeding groove would be provided on the interior bearing surface, the lubricant reaching the exterior grooves and bearing surface through the points at which the interior and exterior grooves intercommunicate.

It has been found that bearing-bushes with grooves as set forth in this invention do not produce ridges on the shafts on which they rotate and further cause the lubricant supplied to the bush to be distributed over the bearing surface thereof in a more uniform manner than heretofore.

It will be appreciated that many different applications and constructions of this invention may be made without departing from the scope thereof as defined in the appended claims.

I claim:

1. A floating bearing-bush having interior and exterior bearing surfaces in which each of said bearing surfaces is provided with at least one endless groove having a cam-like path extending circumferentially therearound, and in which the grooves on the exterior and the interior bearing surfaces intercommunicate where their paths cross.

2. A floating bearing-bush having interior and exterior bearing surfaces in which each of said bearing surfaces is provided with at least one endless groove having a cam-like path extending circumferentially therearound, and in which the paths of the grooves on the exterior and the interior bearing surfaces cross and the sum of the depths of the exterior and the interior grooves is at least equal to the thickness of the bearing-bush so that an opening is formed therethrough at each point where said paths cross.

3. A floating bearing-bush having interior and exterior bearing surfaces in which each bearing surface has two endless grooves, the path of each said groove extends circumferentially around the bearing surface on which it is provided, traverses a substantial portion of the length thereof, crosses the path of each of the other grooves on both the interior and exterior bearing surfaces, and all said grooves intercommunicate where their paths cross.

4. In or for an air-craft wheel hub a loose or floating bearing-bush having interior and exterior bearing surfaces in which each bearing surface has two endless grooves, the path of each said groove extends circumferentially around the bearing surface on which it is provided, traverses a substantial portion of the length thereof, crosses at one or more points the path of each of the other grooves on both the interior and exterior bearing surfaces, all said grooves intercommunicate where their paths cross, and an additional endless circumferential groove is provided in the exterior bearing surface adapted to cooperate with means on the wheel hub in which the bush is, or is to be, fitted in order to retain the bush rotatably therein.

In testimony whereof I affix my signature.

THOMAS SLOPER.